(12) United States Patent
Teets

(10) Patent No.: US 6,845,621 B2
(45) Date of Patent: Jan. 25, 2005

(54) ANNULAR COMBUSTOR FOR USE WITH AN ENERGY SYSTEM

(75) Inventor: J. Michael Teets, Hobe Sound, FL (US)

(73) Assignee: Elliott Energy Systems, Inc., Stuart, FL (US)

( * ) Notice: Subject to any disclaimer, the term of this patent is extended or adjusted under 35 U.S.C. 154(b) by 129 days.

(21) Appl. No.: 10/275,049

(22) PCT Filed: May 1, 2001

(86) PCT No.: PCT/US01/14115
§ 371 (c)(1),
(2), (4) Date: Oct. 31, 2002

(87) PCT Pub. No.: WO01/83963
PCT Pub. Date: Nov. 8, 2001

(65) Prior Publication Data
US 2003/0205050 A1 Nov. 6, 2003

Related U.S. Application Data
(60) Provisional application No. 60/200,946, filed on May 1, 2000.

(51) Int. Cl.[7] .............................................. F23R 3/50
(52) U.S. Cl. ............................ 60/804; 60/732; 60/749
(58) Field of Search ......................... 60/804, 732, 752, 60/749

(56) References Cited

U.S. PATENT DOCUMENTS

| | | |
|---|---|---|
| 3,439,498 A | 4/1969 | Melconian |
| 3,645,095 A | 2/1972 | Melconian |
| 3,738,106 A | 6/1973 | Stein et al. |
| 3,745,766 A | 7/1973 | Melconian |
| 3,869,864 A | 3/1975 | Bunn |
| 4,013,088 A | 3/1977 | Gocke et al. |
| 4,040,251 A | 8/1977 | Heitmann et al. |
| 4,041,699 A | 8/1977 | Schelp |
| 4,054,028 A | 10/1977 | Kawaguchi |
| 4,151,709 A | 5/1979 | Melconian et al. |
| 4,285,193 A | 8/1981 | Shaw et al. |
| 4,292,801 A | 10/1981 | Wilkes et al. |
| 4,420,929 A | 12/1983 | Jorgensen et al. |
| 4,698,963 A | 10/1987 | Taylor |
| 4,702,073 A | 10/1987 | Melconian |
| 4,721,454 A | 1/1988 | Schirmer et al. |
| 4,784,600 A | 11/1988 | Moreno |
| 4,787,208 A | 11/1988 | DeCorso |
| 4,794,754 A | 1/1989 | Shekleton et al. |
| 4,819,438 A | 4/1989 | Schultz |
| 4,825,640 A | 5/1989 | Shekleton |
| 4,891,936 A | 1/1990 | Shekleton et al. |
| 4,910,957 A | 3/1990 | Moreno et al. |
| 4,912,931 A | 4/1990 | Joshi et al. |
| 4,928,479 A | 5/1990 | Shekleton et al. |
| 4,949,545 A | 8/1990 | Shekleton |
| 4,967,562 A | 11/1990 | Shekleton |
| 4,982,570 A | 1/1991 | Waslo et al. |
| 4,989,404 A | 2/1991 | Shekleton |
| 4,996,838 A | 3/1991 | Melconian |
| 5,002,483 A | 3/1991 | Becker |
| 5,025,622 A | 6/1991 | Melconian |
| 5,027,603 A | 7/1991 | Shekleton et al. |
| 5,033,263 A | 7/1991 | Shekleton et al. |
| 5,052,919 A | 10/1991 | Becker |
| 5,058,375 A | 10/1991 | Shekelton et al. |
| 5,062,262 A | 11/1991 | Shekleton et al. |
| 5,085,039 A | 2/1992 | Shekleton |
| 5,101,620 A | 4/1992 | Shekleton et al. |

(List continued on next page.)

Primary Examiner—Michael Koczo
(74) Attorney, Agent, or Firm—Webb Ziesenheim Logsdon Orkin & Hanson, P.C.

(57) ABSTRACT

An annular combustor has an annular inner shell, an annular outer shell and a dome end wall connecting the inner shell with the outer shell. A dam is positioned between the dome end wall and the exit end and extends radially from at least one of the inner shell and the outer shell to provide a reduced flow area passageway within the combustion chamber.

25 Claims, 3 Drawing Sheets

U.S. PATENT DOCUMENTS

| | | |
|---|---|---|
| 5,113,647 A | 5/1992 | Shekleton |
| 5,127,221 A | 7/1992 | Beebe |
| 5,129,224 A | 7/1992 | Shekleton |
| 5,140,808 A | 8/1992 | Shekleton et al. |
| 5,150,570 A | 9/1992 | Shekleton |
| 5,163,284 A | 11/1992 | Shekleton |
| 5,172,546 A | 12/1992 | Shekleton et al. |
| 5,177,955 A | 1/1993 | Shekleton |
| 5,177,956 A | 1/1993 | Shekleton |
| 5,207,053 A | 5/1993 | Spadaccini et al. |
| 5,207,055 A | 5/1993 | Shekleton et al. |
| 5,235,804 A | 8/1993 | Colket, III et al. |
| 5,261,224 A | 11/1993 | Shekleton et al. |
| 5,263,316 A | 11/1993 | Shekleton |
| 5,277,022 A | 1/1994 | Shekleton et al. |
| 5,285,628 A | 2/1994 | Korenberg |
| 5,285,630 A | 2/1994 | Ansart et al. |
| 5,297,385 A | 3/1994 | Dubell et al. |
| 5,303,543 A | 4/1994 | Shah et al. |
| 5,317,864 A | 6/1994 | Shorb et al. |
| 5,319,935 A | 6/1994 | Toon et al. |
| 5,323,604 A | 6/1994 | Ekstedt et al. |
| 5,331,803 A | 7/1994 | Shekleton |
| 5,363,644 A | 11/1994 | Shekleton et al. |
| RE34,962 E | 6/1995 | Shekleton et al. |
| 5,456,080 A | 10/1995 | Shekleton |
| 5,577,380 A | 11/1996 | Shekleton et al. |
| 5,735,126 A | 4/1998 | Schulte-Werning |
| 5,749,219 A | 5/1998 | DuBell |
| 5,819,540 A | 10/1998 | Massarani |
| 5,850,732 A | 12/1998 | Willis et al. |
| 5,927,066 A | 7/1999 | Shekleton et al. |
| 5,950,417 A | 9/1999 | Robertson, Jr. et al. |
| 5,996,351 A | 12/1999 | Feitelberg et al. |
| 6,453,658 B1 * | 9/2002 | Willis et al. .................. 60/804 |

* cited by examiner

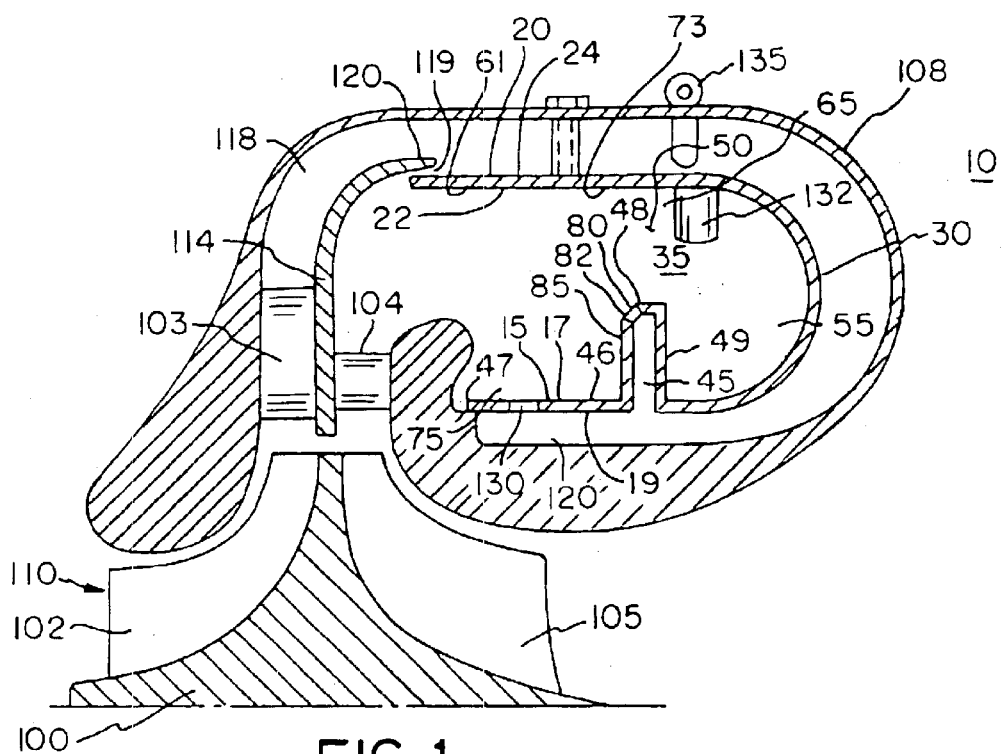
FIG. 1
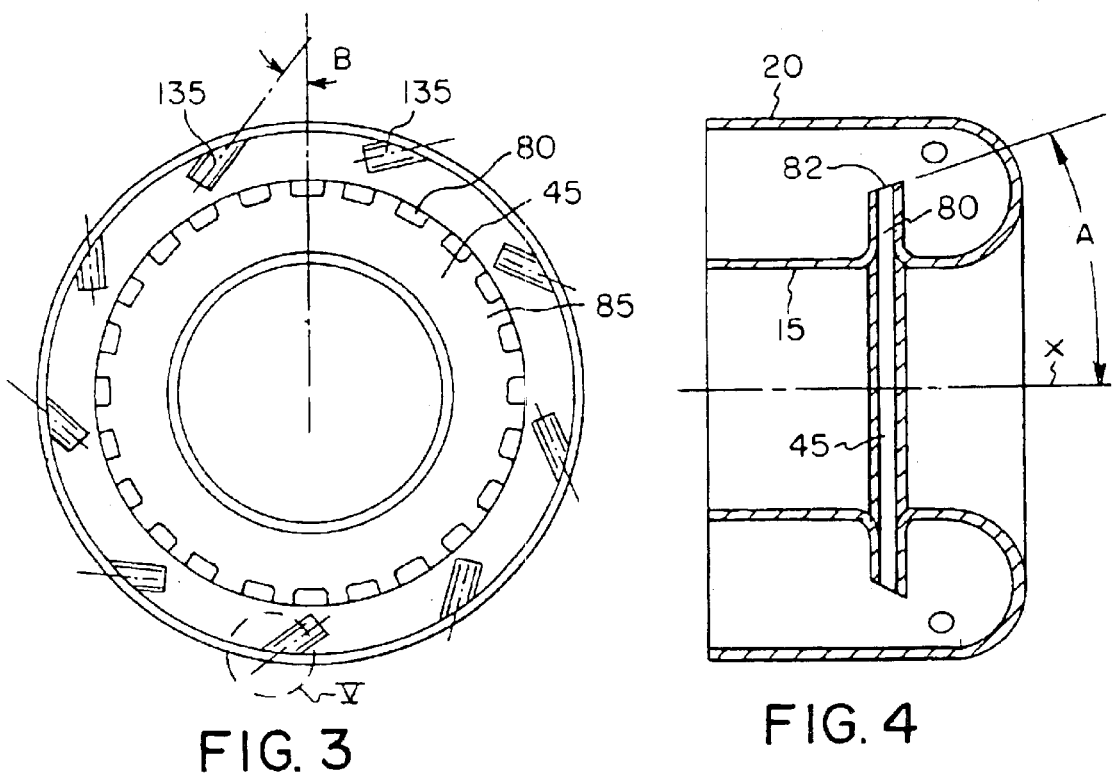
FIG. 3
FIG. 4

ANNULAR COMBUSTOR FOR USE WITH AN ENERGY SYSTEM

CROSS-REFERENCE TO RELATED APPLICATIONS

This application claims the benefit of U.S. Provisional Application No. 60/200,946 filed May 1, 2000.

BACKGROUND OF THE INVENTION

1. Field of the Invention

The invention relates to combustors and more particularly, to annular combustors used with an energy system.

2. Description of the Prior Art

Combustors are conceptually straightforward devices. They provide a chamber in which a fuel and an oxidant, such as air, are combined and burned to create hot gases of combustion. In practice, however, designing an efficient combustor is a complex task. In order to extract a maximum available energy from the fuel, and to reduce emissions to a minimum level, a combustor must provide an environment in which complete combustion of the fuel can occur. Provisions must be made to thoroughly mix the fuel and oxidant. Where the fuel to be burned in the combustor is a liquid, such as diesel fuel, rather than a gas such as propane or natural gas, the combustor must also provide some means for atomizing and evaporating the liquid before combustion can occur. The combustor must also include some means for igniting the fuel and oxidant mixture, as well as means for maintaining a stable flame following ignition. Annular combustors for use with energy systems are known, such as that disclosed PCT Application No. PCT/US97/22007, which is hereby incorporated by reference.

It is an object of the present invention to provide an annular combustor that results in low NOx, CO, and unburned hydrocarbon emissions, as well as resulting in efficient use of fuel.

SUMMARY OF THE INVENTION

An annular combustor is comprised of an annular inner shell having an inner surface and an outer surface, a coaxial annular outer shell having an inner surface and an outer surface, and a dome end wall connecting the inner shell and outer shell. The inner shell, the outer shell and the dome end wall define an annular combustion chamber having a chamber width between the inner surface of the outer shell and the outer surface of the inner shell, wherein the chamber extends along a longitudinal axis and has an exit end opposite the dome end wall. A dam is positioned between the dome end wall and the exit end and extends radially from at least one of the inner shell and the outer shell. The dam defines a reduced flow area passageway within the combustion chamber and channels supplying secondary air to the combustion process.

Additionally, an annular combustor is comprised of an annular inner shell having an inner surface and an outer surface, a coaxial annular outer shell having an inner surface and an outer surface and a dome end wall connecting the inner shell and outer shell, wherein the inner shell, the outer shell and the dome end wall define an annular combustion chamber having a chamber width between the inner surface of the outer shell and the outer surface of the inner shell, wherein the chamber extends along a longitudinal axis and has an exit end opposite the dome end wall. A dam positioned between the dome end wall and the exit end and extending radially from at least one of the inner shell and the outer shell, wherein the dam defines a reduced flow area passageway within the combustion chamber. The combustion chamber has a primary zone defined by the region of the combustion chamber between the dome end wall and the dam of the combustor, a secondary zone defined by the region of the combustion chamber adjacent to the dam and a dilution zone defined by the region of the combustion chamber between the dam and the exit end. The combustor further includes a means for providing fuel and air or oxygen into the primary zone, means for ignition provided in the primary zone, a plurality of air or oxygen passageways defined in the secondary zone, and a plurality of air or oxygen passageways provided in the dilution zone.

DESCRIPTION OF THE DRAWINGS

FIG. 1 is a cross sectional side view of a compressor/turbine including a combustor made in accordance with the present invention;

FIG. 3 is an end elevational view of the combustor in accordance with the present invention;

FIG. 4 is a side elevational view of the combustor, shown in FIG. 2;

DESCRIPTION OF THE PREFERRED EMBODIMENT

Figure 2:
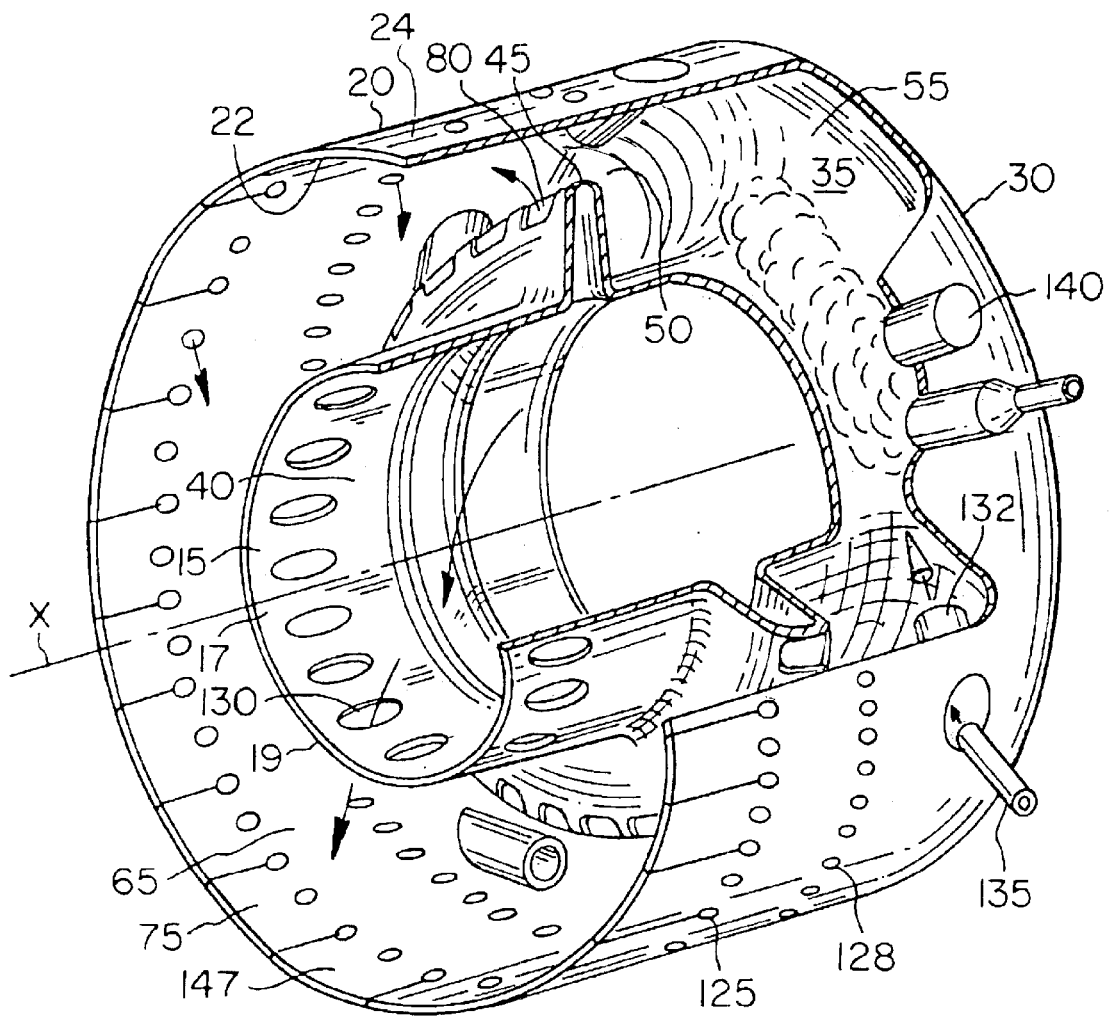
FIG. 2 is a perspective view of a combustor in accordance with the present invention.

FIG. 1 illustrates an annular combustor 10 in accordance with the subject invention connected to a compressor/turbine arrangement 100. The compressor/turbine arrangement 100 includes compressor blades 102, a diffuser 103, turbine blade nozzle vanes 104, and turbine blades 105 positioned around a rotary drive shaft (not shown), which rotates about a longitudinal axis X. The combustor 10, further illustrated in FIG. 2, is comprised of an annular inner shell 15, having an inner surface 17, and an outer surface 19. The combustor 10 furthermore has a co-axial annular outer shell 20, having an inner surface 22, and an outer surface 24. A dome end wall 30 connects the inner shell 15 and the outer shell 20, wherein the inner shell 15, the outer shell 20 and the dome end wall 30 define an annular combustion chamber 35, having a chamber width W between the outer surface 19 of the inner shell 15 and the inner surface 22 of the outer shell 20. The chamber 35 extends along the longitudinal axis X, and has an exit end 40 opposite the dome end wall 30. A dam 45 is positioned between the dome end wall 30 and the exit end 40 and extends radially outwardly from the inner shell 15 to define a reduced flow area passageway 50 within the combustion chamber 35.

It should be appreciated and will be explained further that the dam 45 may extend radially outwardly from the inner shell 15 as illustrated in FIGS. 1 and 2, or, in the alternative, may extend radially inwardly from the outer shell 20, or, in yet another alternative, may extend both radially outwardly from the inner shell 15, and radially inwardly from the outer shell 20.

Returning to FIG. 1, within the compressor/turbine arrangement 100, an annular housing wall 108 is provided and defines an air intake passage 110 positioned adjacent to compressor blades 102. An inner housing wall 114, is positioned adjacent to the exit end 40 of the combustor 10 to enclose the combustion chamber 35. The combustion chamber 35, the air path 118 and the turbine blades 105 are in fluid communication with each other. An annular cooling area 119 is defined by a distal end 120 of the forward housing wall 114 and the outer shell 20 of the combustor 10. The annular cooling area 119 allows for more dilution air toward the turbine nozzle vanes 104 and turbine blades 105.

Air entering the air intake passage 110 is directed through passageway 118 along the exterior surface of the combustor 10, and is introduced into the combustion chamber 35 through a number of passageways 125, 128, 130 and openings 80 extending through the walls of the combustor and, furthermore, is introduced to the combustion chamber 35 at the end 120 of passageway 118. A plurality of fuel/air mixing tubes 132 extends through the wall of the combustor 10 to provide fuel delivery to the primary zone 55 of the chamber 35. The fuel/air mixing tubes 132, which are tubular in shape, are adapted to angularly direct liquid or gas fuel and compressed air or oxygen into the primary zone 55 of the combustor 10. An igniter 140 passes through the combustor 10 and into the combustion chamber 35, where it may ignite the air-fuel mixture within the chamber 55 until the combustion is self-sustaining.

Directing attention to FIGS. 1 and 2, the combustion chamber 35 is comprise of a primary zone 55, a secondary zone 65, and a dilution zone 75. The primary zone 55 is the region within the chamber 35 between the dome end wall 30 and the dam 45. The secondary zone 65 is the region within the chamber 35 generally circumferential with the dam 45. The dilution zone 75 is the region within the chamber 35 between the dam 45 and the exit end 40.

Figure 6:
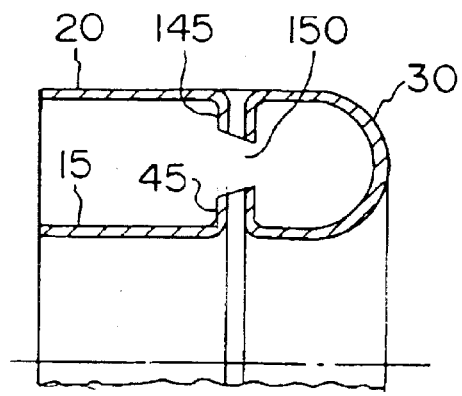
FIG. 6 is a side elevational view of an alternate embodiment of the combustor in FIG. 1.
Figure 7:
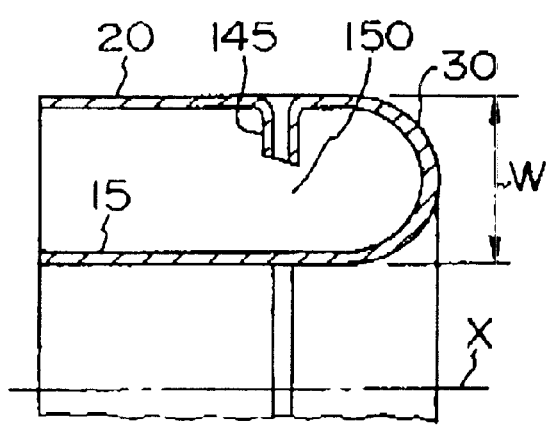
FIG. 7 is a side elevational view of another alternative embodiment of the combustor shown in FIG. 1.

As previously discussed, the dam 45 illustrated in FIG. 2 extends outwardly from the inner shell 15. It is entirely possible, as illustrated in the schematic in FIG. 6, to supplement dam 45 with a second dam 145 which may extend radially inwardly from the outer shell 20 to define a passageway 150. In the alternative, as illustrated in FIG. 7, it is possible to entirely eliminate dam 45, such that the sole dam within the combustor 10 is dam 145 extending radially inwardly from the outer shell 20.

Returning to FIG. 1, the dam 45 may be comprised of two distinct part wherein a first part 46, extending from the exit side 47 to the circumferential edge 48 of the dam 45, is positioned adjacent to a second part 49. The dam parts 46, 49 may be welded to one another or may be held securely against one another by means of a common anchor plate.

Returning to FIG. 2, and additionally directing attention to FIG. 3, the dam 45 has a plurality of openings 80 extending therethrough to permit fluid communication between the inner surface 17 of the inner shell 15, and the outer surface 19 of the inner shell 15. The openings 80 may extend radially through the dam 45.

As illustrated in FIG. 4, the dam 45 has a circumferential face 82 which may be angled relative to the longitudinal axis X, such that the openings 80 extend toward the exit end 40 of the combustor 10. These circumferential faces 82 may have an angle A between 0 degrees and 80 degrees with the longitudinal axis X thereby directing fluid from the openings 80 toward the exit end 40 of the combustor 10.

As illustrated in FIG. 3, the radially extending openings 80 are spaced apart may provide an interrupted pattern at the front side 85 of the dam 45. As previously mentioned, the dam 45 may be supplemented with a second dam 145 as illustrated in FIG. 6. Under these circumstances the same features discussed with the single dam 45 may also be implemented. In the alternative, and as previously mentioned, dam 45 may be eliminated such that the single remaining dam is dam 145 and once again similar features may be applied to the single dam 145.

The dams 45 and 145 may extend radially from the respective inner shell 15 or outer shell 20 a distance of less then one-half the chamber width W. Preferably, the dams extend a distance of approximately one-third of the chamber width W. It should be appreciated in the instances of one dam extending from each of the inner shell 15 and the outer shell 20, each dam may radially extend the distance approximately one-third of the chamber width W.

As illustrated in FIGS. 1 and 2, the dam 45 may be an integral part of the inner shell 15 from which it extends. In actuality, the inner shell 15 is formed to incorporate the shape of the dam 45 and, as a result, the dam is essentially hollow and the openings occur only at the circumferential face 82 of the dam 45.

Figure 8:
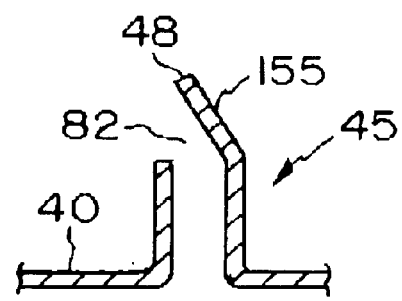
FIG. 8 is a side elevational view of an alternate embodiment of the dam illustrated in FIG. 1.

FIG. 8 illustrates another embodiment of dam 45. A deflector 155 is located along the circumferential edge 48 of the dam 45 such that fluid passing through the dam 45 is deflected toward the exit end 40 of the combustor 10. Under these circumstances the openings 80 is in the wall of the dam 45 facing the exit end 40. The deflector assures a smooth uninterrupted flow of secondary air mixing with the primary fuel/air mixture in a direction toward the exit end 40 to assure no secondary air is introduced into the primary zone and furthermore provides a surface to accept the through flow of secondary air in an impinging cooling scheme.

Circumferentially spaced slotted sections 147 are provided about the exit end 40 of the outer shell for receipt of an exit wall to direct the products of combustion away from the combustor and toward, for example, the turbine blades.

Figure 5:
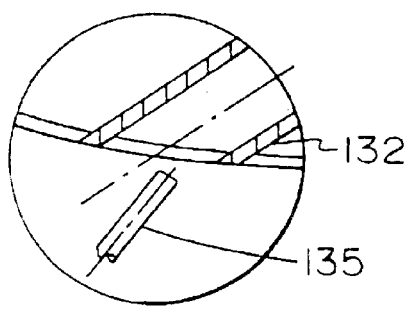
FIG. 5 is an enlarged detail of the encircled area shown in FIG. 3.

In operation, compressed air or oxygen at, for example, 45 psig is provided via a compressor and surrounds the outer surface of the combustor 10. Fuel is directed by a fuel injector 135 toward respective inner surfaces of the angled fuel/air premix tubes 132 (FIG. 5). Compressed air and/or oxygen also flows into the angled fuel/air premix tubes 132 forming a rich fuel to air mixture. The angled tubes 132 create a circumferential swirling action. The fuel/air mixture exits the tubes 132 into the first section at an angle B (FIG. 3). Preferably, the angle B is not great enough to direct the fuel/air or oxygen mixture directly or tangentially against the inner surface of the shell. Preferably, only enough air or oxygen is provided to create a rich fuel mixture. This rich fuel mixture is then ignited by the igniter 140. As combustion takes place, products of combustion (POC) are formed through partial combustion. The POC and other materials then flow toward the dam 45 in this secondary zone 65. Additional compressed air and/or oxygen are directed in a radial direction through passageways 128 resulting in a lean mixture. Further, since the flow area of the combustion chamber 45 is reduced in the secondary zone 65, the velocity of the mixture increases over that in the primary zone 55. The resulting mixture in the secondary zone 65 is a lean mixture. Additional combustion takes place and the mixture and POC travel toward dilution zone 75. Dilution air is added into the dilution zone at passageways 125, 130 to provide the required turbine inlet temperature, and desired low flame pattern factor. The POC's then leave the dilution zone 75, and are directed toward turbine blades 105 via the turbine nozzle vanes 104.

It is thought the present invention and many of its intended advantages will be understood from the foregoing description and that it will be apparent that various changes may be made in the form construction an arrangement of the parts thereof, without departing from the spirit and scope of the invention, or sacrificing all of its material advantages, the form herein before described merely preferred or exemplary embodiments thereof.

What is claimed:

1. An annular combustor comprising:
   a) an annular inner shell having an inner surface and an outer surface;
   b) a coaxial annular outer shell having an inner surface and an outer surface;
   c) a dome end wall connecting the inner shell and outer shell, wherein the inner shell, the outer shell and the dome end wall define an annular combustion chamber having a chamber width between the inner surface of the outer shell and the outer surface of the inner shell, wherein the chamber extends along a longitudinal axis and has an exit end opposite the dome end wall;
   d) a dam positioned between the dome end wall and the exit end and extending radially from at least one of the inner shell and the outer shell, wherein the dam defines a reduced flow area passageway within the combustion chamber, wherein the dam is generally perpendicular to one of the inner shell and the outer shell thereby defining a primary combustion zone between the dam and the dome, a secondary combustion zone adjacent to the dam and a dilution zone between the secondary combustion zone and the exit end of the chamber, and wherein the dam has a plurality of bores extending therethrough.

2. The annular combustor according to claim 1 wherein the dam protrudes radially outwardly from the inner shell.

3. The annular combustor according to claim 1 wherein the bores extend radially through the dam.

4. The annular combustor according to claim 3 wherein the dam has a circumferential face which is angled relative to the longitudinal axis such that the bores provide openings extending toward the exit end of the combustor.

5. The annular combustor according to claim 1 further including a deflector located along a circumferential edge of the dam and angled to direct fluid toward the exit end of the combustor.

6. The annular combustor according to claim 1 wherein the radially extending openings through the dam are spaced apart to provide an interrupted pattern at the face of the dam.

7. The annular combustor according to claim 1 wherein the dam protrudes radially inwardly from the outer shell.

8. The annular combustor according to claim 7 wherein the dam has a plurality of bores extending therethrough to permit fluid communication between the inner surface of the inner shell and the outer surface of the inner shell.

9. The annular combustor according to claim 8 wherein the bores extend radially through the dam.

10. The annular combustor according to claim 9 wherein the dam has an inner face which is angled relative to the longitudinal axis such that the bores provide openings extending toward the exit end of the combustor.

11. The annular combustor according to claim 9 further including a deflector located along a circumferential edge of the dam and angled to direct fluid toward the exit end of the combustor.

12. The annular combustor according to claim 8 wherein the radially extending openings through the dam are spaced apart to provide an interrupted pattern at the face of the dam.

13. The annular combustor according to claim 1 wherein a first dam protrudes radially outwardly from the inner shell and a second dam protrudes radially inwardly from the outer shell.

14. The annular combustor according to claim 13 wherein the dam has a plurality of openings extending therethrough to permit fluid communication between the inner surface of the inner shell and the outer surface of the inner shell.

15. The annular combustor according to claim 14 wherein the bores extend radially through the dam.

16. The annular combustor according to claim 15 wherein the dam has an inner face which is angled relative to the longitudinal axis such that the bores provide openings extending toward the exit end of the combustor.

17. The annular combustor according to claim 9 further including a deflector located along a circumferential edge of the dam and angled to direct fluid toward the exit end of the combustor.

18. The annular combustor according to claim 14 wherein the radially extending bores through the dam are spaced apart to provide an interrupted pattern at the face of the dam.

19. The annular combustor according to claim 1 wherein the dam extends circumferentially about the longitudinal axis.

20. The annular combustor according to claim 1 wherein the dam radially extends from one of the inner shell or the outer shell a distance of less than ½ the chamber width.

21. The annular combustor according to claim 20 wherein the dam radially extends a distance of approximately ⅓ the chamber width.

22. The annular combustor according to claim 1 wherein each dam is an integral part of the shell from which it extends.

23. An annular combustor comprising:
   a) an annular inner shell having an inner surface and an outer surface;
   b) a coaxial annular outer shell having an inner surface and an outer surface;
   c) a dome end wall connecting the inner shell and outer shell, wherein the inner shell, the outer shell and the dome end wall define an annular combustion chamber having a chamber width between the inner surface of the outer shell and the outer surface of the inner shell, wherein the chamber extends along a longitudinal axis and has an exit end opposite the dome end wall;
   d) a dam positioned between the dome end wall and the exit end and extending radially from at least one of the inner shell and the outer shell, wherein the dam defines a reduced flow area passageway within the combustion chamber, wherein the dam is generally perpendicular to one of the inner shell and the outer shell thereby defining a primary combustion zone between the dam and the dome, a secondary combustion zone adjacent to the dam and a dilution zone between the secondary combustion zone and the exit end of the chamber, and wherein the dam has a plurality of bores extending therethrough.
   e) wherein the combustion chamber has:
      i) a primary zone defined by a front portion of the inner shell, a front portion of the outer shell, a front surface of the dam and the inner surface of the dome end wall;
      ii) a secondary zone defined by a circumferential surface of the dam and a coaxial portion of one or both of the inner shell or outer shell; and
      iii) a dilution zone defined by a rear portion of the inner shell, a rear portion of the outer shell, and downstream adjacent to the secondary zone and exit end of the combustion chamber;

f) means for providing fuel and air or oxygen into the primary zone;

g) means for ignition provided in the primary zone;

h) a plurality of air or oxygen passageways defined in the secondary zone; and i) a plurality of air or oxygen passageways provided in the dilution zone.

24. An annular combustor comprising:

a) an annular inner shell having an inner surface and an outer surface;

b) a coaxial annular outer shell having an inner surface and an outer surface;

c) a dome end wall connecting the inner shell and outer shell, wherein the inner shell, the outer shell and the dome end wall define an annular combustion chamber having a chamber width between the inner surface of the outer shell and the outer surface of the inner shell, wherein the chamber extends along a longitudinal axis and has an exit end opposite the dome end wall; and d) a first dam and a second dam positioned between the dome end wall and the exit end, wherein the first dam extends radially from the inner shell and wherein the second dam extends radially from the outer shell to define a reduced flow area passageway within the combustion chamber, wherein each dam has a plurality of bores extending therethrough.

25. The annular combustor according to claim 24 wherein the first dam and second dam are coplanar with one another.

* * * * *